US008339409B2

(12) United States Patent
Shreiner (10) Patent No.: US 8,339,409 B2
(45) Date of Patent: Dec. 25, 2012

(54) TILE-BASED GRAPHICS SYSTEM AND METHOD OF OPERATION OF SUCH A SYSTEM

(75) Inventor: David Robert Shreiner, Mountain View, CA (US)

(73) Assignee: ARM Limited, Cambridge (GB)

( * ) Notice: Subject to any disclaimer, the term of this patent is extended or adjusted under 35 U.S.C. 154(b) by 51 days.

(21) Appl. No.: 12/929,807

(22) Filed: Feb. 16, 2011

(65) Prior Publication Data
US 2012/0206455 A1 Aug. 16, 2012

(51) Int. Cl.
*G06T 15/30* (2011.01)
*G06T 1/20* (2006.01)
*G06F 15/16* (2006.01)
*G09G 5/36* (2006.01)
*G09G 5/00* (2006.01)
*G06K 9/36* (2006.01)
*G06K 9/54* (2006.01)
*G06K 9/60* (2006.01)

(52) U.S. Cl. ........ 345/581; 345/423; 345/606; 345/502; 345/506; 345/545; 382/276; 382/304; 382/305; 382/307

(58) Field of Classification Search .......... 345/418–427, 345/581–582, 586, 600, 606, 612, 629–690, 345/501–503, 505–506, 538, 545, 619, 543, 345/547, 554, 562, 565; 382/254, 274–276, 382/282, 284–285, 300, 303–305, 307, 302
See application file for complete search history.

(56) References Cited

U.S. PATENT DOCUMENTS

| 6,608,625 | B1 | 8/2003 | Chin et al. | |
| 6,636,212 | B1 | 10/2003 | Zhu | |
| 7,053,893 | B1 * | 5/2006 | Molnar et al. | 345/426 |
| 2004/0012596 | A1 | 1/2004 | Allen et al. | |
| 2006/0209065 | A1 * | 9/2006 | Lapidous et al. | 345/422 |
| 2008/0024522 | A1 * | 1/2008 | Crow et al. | 345/621 |
| 2008/0030513 | A1 | 2/2008 | Jiao et al. | |
| 2008/0074431 | A1 | 3/2008 | Bakalash et al. | |
| 2011/0242113 | A1 * | 10/2011 | Keall et al. | 345/505 |
| 2011/0261059 | A1 * | 10/2011 | Keall et al. | 345/442 |

FOREIGN PATENT DOCUMENTS

GB 2472897 2/2011

OTHER PUBLICATIONS

UK Search Report dated May 21, 2012 in GB 1200857.9.

* cited by examiner

*Primary Examiner* — Wesner Sajous
(74) *Attorney, Agent, or Firm* — Nixon & Vanderhye P.C.

(57) ABSTRACT

A tile-based graphics system, and method of operation of such a system, are provided for generating graphics data for a frame comprising a plurality of tiles. Graphics processing circuitry is provided which is arranged to be switched between a first mode of operation and a second mode of operation. In the first mode of operation, the graphics processing circuitry receives the plurality of graphics primitives for the frame, and performs a binning operation to determine, for each of the plurality of tiles, a tile list identifying the graphics primitives which intersect that tile. In the second mode of operation, the graphics processing circuitry receives the tile list for an allocated tile, and performs a rasterization operation to generate the graphics data for the allocated tile dependent on the tile list. This enables the same graphics processing unit to be used for both binning and rasterization operations, significantly reducing the size of the graphics system, while also allowing improvements in performance and energy consumption.

19 Claims, 10 Drawing Sheets

TILE-BASED GRAPHICS SYSTEM AND METHOD OF OPERATION OF SUCH A SYSTEM

BACKGROUND OF THE INVENTION

1. Field of the Invention

The present invention relates to a tile-based graphics system and a method of operation of such a system.

2. Description of the Prior Art

Tile-based graphics systems have been developed where, for each frame to be displayed, the frame is partitioned into a plurality of areas called tiles. For each graphics primitive (typically a point, line or triangle) to be displayed in the frame, a binning unit is provided for performing a binning operation in order to determine which of the various tiles that graphics primitive intersects. In particular, the binning unit will typically specify a plurality of bins, for example one bin for each tile, and then based on coordinate data for the graphics primitive will determine which tile or tiles that graphics primitive intersects, and for each tile that is intersected, will record an identifier for that graphics primitive within the relevant bin.

Whilst there may be a one-to-one correspondence between bins and tiles, such that a separate bin is provided for each tile, it is not necessary to arrange the bins in this way, and instead multiple tiles can be associated with individual bins. This can enable a reduction in the amount of binning data that needs to be stored. However, irrespective of how the actual bins are constructed by the binning unit, on completion of the binning operation, all of the graphics primitives to be displayed within the frame will have been considered, and the binning data produced by the binning operation will provide a tile list for each tile. In particular, the tile list will identify, for the corresponding tile, the graphic primitives that intersect that tile.

Only once the binning operation is complete can the graphics system then proceed to generate the graphics data (also referred to herein as pixel data) for each tile. In particular, at this stage, the rasterization unit of the graphics system will be allocated a particular tile, and will generate the graphics data for the allocated tile dependent on the tile list applicable to that tile. For those graphics primitives identified in the tile list, the rasterization process determines which pixels the various graphics primitives lie in, and then applies a shader algorithm in order to generate pixel data for each pixel.

Since at the rasterization stage there are separate tile lists for each tile, then if multiple rasterization engines are provided within the graphics system, it is possible to parallelise the rasterization process by allocating different tiles to different rasterization engines, thereby improving performance.

However, before performing rasterization, it is typical to complete the binning operation since only when the binning operation is complete, and hence all graphics primitives for the frame have been considered, can the tile list for any particular tile be considered to be complete. The dedicated binning unit required to perform the binning operation occupies significant area within a graphics system employing a hardware binning unit. Even in systems where the binning operation is performed in software, the binning implementation is completely discrete from other parts to the graphics system. Further, irrespective of whether a hardware or software binning implementation is provided, the binning operation typically takes a significant amount of time, which adversely affects the overall performance of the graphics rendering process.

Accordingly, it would be desirable to provide an improved tile-based graphics system and method of operation of such a system.

SUMMARY OF THE INVENTION

Viewed from a first aspect, the present invention provides a tile-based graphics system for generating graphics data for a frame comprising a plurality of tiles, comprising: an input means for receiving a plurality of graphics primitives for the frame; graphics processing circuitry configured to operate in a first mode of operation and a second mode of operation; in said first mode of operation said graphics processing circuitry receiving said plurality of graphics primitives from said input means, and being configured to perform a binning operation to determine, for each of said plurality of tiles, a tile list identifying the graphics primitives from amongst said plurality which intersect that tile; in said second mode of operation, said graphics processing circuitry receiving said tile list for an allocated tile, and being configured to perform a rasterization operation to generate said graphics data for said allocated tile dependent on said tile list; and control circuitry for controlling switching of the graphics processing circuitry between said first mode of operation and said second mode of operation.

In accordance with the present invention, graphics processing circuitry is provided which can be switched between a first mode of operation and the second mode of operation. In the first mode of operation, the graphics processing circuitry receives the plurality of graphics primitives to be displayed, and performs a binning operation in order to produce a tile list for each tile. In the second mode of operation, the graphics processing circuitry receives a tile list for a particular tile, and performs a rasterization operation in order to generate the graphics data for that tile.

The inventor of the present invention observed that there were underlying similarities between the binning operation and the rasterization operation performed in graphics systems. In particular, both processes compute the intersection of a geometric primitive to a rectangular region (a tile in the case of the binning operation, and a pixel in the case of the rasterization operation), and then generate some stored data for that rectangular region (the tile list for the binning operation and pixel data for the rasterization operation). Based on this observation, the inventor produced a graphics processing unit which can be arranged in one mode of operation to perform the binning operation and in another mode of operation to perform the rasterization operation. This significantly reduces the size and complexity of the tile-based graphics system relative to known prior art techniques that employ a separate binning unit, and in particular embodiments enables a variety of performance improvements to be realised.

In one embodiment, the graphics processing circuitry comprises a working memory comprising a plurality of memory blocks. In said first mode of operation, each memory block is associated with a tile, and during the binning operation is used to record which graphics primitives from amongst said plurality intersect the associated tile, and in said second mode of operation, each memory block is associated with a pixel of the allocated tile, and during said rasterization operation is used to store pixel data generated for the associated pixel. Hence, in accordance with such an embodiment, the same memory structure can be used in both modes of operation with the information stored in each memory block differing dependent on the mode of operation. This again enables significant sizing improvements to be realised by reducing the amount of memory required. Further, where the working memory is provided locally to the graphics processing circuitry, rather than as a part of system memory, such an approach significantly reduces the number of system memory accesses required. This is particularly true for the binning operation, where in typical prior art systems, the binning unit communicated with the system memory each time a graphics primitive was determined to intersect a tile, and hence an update to a bin was required.

The graphics processing circuitry can be formed in a variety of ways. However, in one embodiment, the graphics processing circuitry is a rasterization circuit that is modified to support said first mode of operation, and the working memory is a tile memory provided for use by the rasterization circuit when performing the rasterization operation, and arranged to be re-used during said first mode of operation to record which graphics primitives from amongst said plurality intersect the tile associated with each memory block. Typical rasterization circuits are highly efficient at detecting intersections of graphics primitives with individual pixels, and when the graphics processing circuitry is modified to also support a binning mode of operation, these efficiencies can also be used to improve the performance of the binning operation and the power consumption expended during the binning operation, when compared with the known prior art approach of using a dedicated binning unit for the binning operation. Further, typical rasterization circuits are provided with a tile memory used during the rasterization operation to record pixel data for each pixel of a tile, and by reusing that tile memory to store the tile list information generated when the graphics processing circuitry is operating in the first mode of operation to perform the binning operation, this yields significant performance improvements when compared with the memory accesses required when performing a binning operation using a typical known prior art dedicated binning unit.

In embodiments where the graphics processing circuitry is formed by a modified rasterization circuit, that modified rasterization circuit may take a variety of forms. However, in one embodiment, the rasterization circuitry comprises selection circuitry which selects individual units from an array of units, in the first mode of operation each unit comprising one of said tiles, and in the second mode of operation each unit comprising a pixel of the allocated tile. The rasterization circuitry also comprises unit processing circuitry for computing, for a selected unit, output data to be associated with that unit, in the first mode of operation the output data indicating which of said plurality of graphics primitives intersect the selected unit, and in the second mode of operation the output data providing pixel data for the selected unit which is dependent on how that selected unit is intersected by said plurality of graphics primitives.

In one particular embodiment, in the first mode of operation the unit processing circuitry executes a geometry intersection algorithm, and in the second mode of operation the unit processing circuitry executes a sample-based shading algorithm. Hence, in such embodiments, it can be seen that the modifications required to the rasterization circuit are relatively small. In particular, the units processed by the selection circuitry merely have a different meaning dependent on the mode of operation, and the unit processing circuitry executes a different algorithm dependent on the mode of operation.

In embodiments where the working memory is shared between the two modes of operation, then the manner in which the working memory is shared, and in particular how the working memory is used in the first mode of operation, can take a variety of forms. However, in one embodiment, each memory block comprises n bits, and during said first mode of operation the graphics processing circuitry performs the binning operation for up to n graphics primitives. Hence, in such embodiments, the n bits of data that are used when performing a rasterization operation to store pixel data for a particular pixel are reused in the first mode of operation to store binning information for up to n graphics primitives. In particular, in one embodiment, each bit position in the memory block is associated with a particular graphics primitive, and the value of that bit is set or cleared dependent on whether that graphics primitive is determined to intersect the tile associated with that memory block.

In one embodiment, if said plurality of graphics primitives exceeds n, the control circuitry is arranged to cause the graphics processing circuitry to iteratively perform said binning operation in said first mode of operation, for each iteration a different n primitives being considered. This approach hence provides the graphics system with flexibility to enable it to deal with differing numbers of graphics primitives specified for a particular frame.

In one embodiment, if the number of tiles in a frame exceed the number of pixels in a tile, the control circuitry is arranged to cause the graphics processing circuitry to iteratively perform said binning operation in said first mode of operation, for each iteration a different region of the frame being considered, each region having a number of tiles which do not exceed the number of pixels in a tile. Hence, such an approach enables the graphics processing system of embodiments to have flexibility to deal with various frame sizes, and hence various display resolutions.

Typically, in instances where it is required to perform the binning operation iteratively, the contents of the working memory will be written to a bin memory between each iteration, such contents for example being used on each iteration to update the contents of the bin memory so that by the time the required iterations have completed, the bin memory contains a complete tile list for each tile.

In one embodiment, the graphics processing circuitry comprises a plurality of graphics processing engines, each of which is controlled by the control circuitry to operate in said first mode of operation or said second mode of operation. In one such embodiment, the control circuitry is arranged to place multiple of said graphics processing engines in said first mode of operation and to allocate different regions of the frame to different ones of those graphics processing engines, such that the binning operation is performed in parallel across the multiple graphics processing engines. Whereas in typical prior art systems where a dedicated binning unit was used to perform the binning operation, the binning operation represented a serialisation point within the graphics pipeline, such embodiments of the present invention remove the serialisation of the binning operation, allowing for the binning operation to be performed in parallel across multiple graphics processing engines, thereby significantly improving performance.

In one embodiment, the tile list produced by the graphics processing circuitry comprises a sequence of bits, each bit being associated with a corresponding graphics primitive and its value indicating whether the corresponding graphics primitive intersects the associated tile or not. In such an embodiment, the tile-based graphics system may further comprise a merging engine for receiving the tile list and a description of each graphics primitive and producing a vector file comprising a plurality of vectors, each vector providing a description of one of said graphics primitives which does intersect the associated tile, the vector file being used by the graphics processing circuitry when operating in said second mode of operation to generate graphics data for said associated tile.

Through use of such a merging engine, an optimisation can be provided whereby the vector file used by the graphics processing circuitry when operating in the second mode of operation contains only the minimum amount of information required to generate the graphics data for the associated tile. This hence leads to an associated increase in performance.

The merging engine may be provided in a variety of ways. However, in one embodiment the merging engine comprises a shading engine provided by the graphics processing circuitry.

The structure provided within the graphics processing circuitry for performing the binning operation whilst the graphics processing circuitry is in the first mode of operation can take a variety of forms. However, in one embodiment the graphics processing circuitry includes a shading engine for performing the binning operation.

Viewed from a second aspect, the present invention provides a method of operating a data processing system to generate graphics data for a frame comprising a plurality of tiles, comprising the steps of: selectively switching graphics processing logic between a first mode of operation and a second mode of operation during the process of generating said graphics data; when in said first mode of operation, said graphics processing logic receiving a plurality of graphics primitives for the frame, and performing a binning operation to determine, for each of said plurality of tiles, a tile list identifying the graphics primitives from amongst said plurality which intersect that tile; when in said second mode of operation, said graphics processing logic receiving said tile list for an allocated tile, and performing a rasterization operation to generate said graphics data for said allocated tile dependent on said tile list; and outputting said graphics data for said frame when the rasterization operation has been performed in respect of each of said tiles.

Whilst the graphics system of one embodiment of the present invention may be provided as a dedicated graphics hardware system, in another embodiment, the graphics system may be embodied by software executing on a general purpose processor. In particular, in accordance with a third aspect of the present invention, the present invention provides a non-transitory storage medium comprising a computer program which, when executed on a computer, causes said computer to perform a method of generating graphics data for a frame comprising a plurality of tiles in accordance with the second aspect of the present invention. In a yet further embodiment, a mixture of hardware and software elements may be used to implement the graphics system.

Viewed from a fourth aspect, the present invention provides a tile-based graphics system for generating graphics data for a frame comprising a plurality of tiles, comprising: input means for receiving a plurality of graphics primitives for the frame; graphics processing means for operating in a first mode of operation and a second mode of operation; in said first mode of operation, said graphics processing means for receiving said plurality of graphics primitives from said input means, and for performing a binning operation to determine, for each of said plurality of tiles, a tile list identifying the graphics primitives from amongst said plurality which intersect that tile; in said second mode of operation, said graphics processing means for receiving said tile list for an allocated tile, and for performing a rasterization operation to generate said graphics data for said allocated tile dependent on said tile list; and control means for controlling switching of the graphics processing means between said first mode of operation and said second mode of operation.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
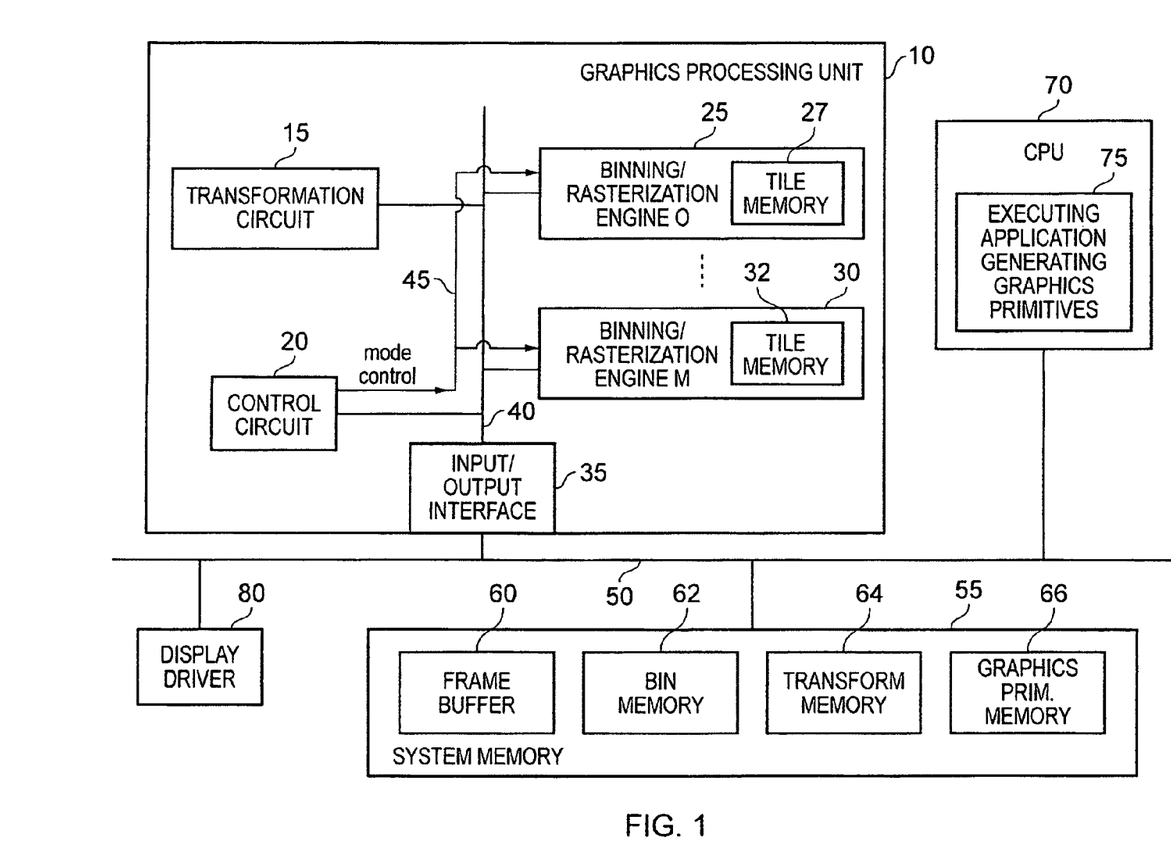
FIG. 1 is a block diagram illustrating a data processing system incorporating a tile-based graphics system in accordance with one embodiment.

FIG. 1 is a block diagram of a data processing system incorporating a tile-based graphics system of one embodiment. The tile-based graphics system consists of a graphics processing unit 10 having a plurality of binning/rasterization engines 25, 30 coupled via an internal bus 40 to control circuitry 20 used to control the mode of operation of each of those binning/rasterization engines. The graphics processing unit 10 also includes a transformation circuit 15 which operates in a standard manner to convert 3D graphics primitives into 2D coordinates based on a viewing angle, and an input/output interface 35 for connecting the graphics processing unit 10 to a system bus 50.

Also connected to the system bus 50 is a central processing unit (CPU) 70 used to execute an application 75 that generates graphics primitives for each frame of graphics data to be displayed. A system memory 55 is provided for storing various data generated during the graphics rendering process. In particular, the system memory 55 will include a graphics primitives memory 66 for storing the graphics primitives generated by the application 75 executing on the CPU 70. When the application has generated a set of graphics primitives for a particular frame, a notification will be issued to the graphics processing unit 10 to cause it to begin processing those graphics primitives. In particular, the transformation circuit 15 will receives via the input/output interface 35 the set of graphics primitives as stored within the graphics primitives memory 66, and will perform a vertex shading operation in order to convert the 3D graphics primitives into equivalent 2D representations, having regards for example to the viewing angle from which the graphics data is to be viewed. These 2D representations of the graphics primitives will then be stored by the transformation circuit 15 into the transform memory 64 within the system memory 55. Once this has been done, then the graphics processing unit 10 is arranged to perform a binning operation.

In order to perform the binning operation, the control circuitry 20 is arranged to issue a mode control signal over path 45 to at least one of the binning/rasterization engines 25, 30, to cause at least one of the binning/rasterization engines to be placed in the first mode of operation. The selected binning/rasterization engine(s) is then arranged to receive the plurality of graphics primitives from the transform memory 64 (i.e. the 2D versions) and to perform a binning operation to produce binning data which, for each of the plurality of tiles constituting the frame, provides a tile list identifying those graphics primitives which intersect that tile. As will be discussed in more detail later, during this process, tile memory 27, 32 associated with the binning/rasterization engine 25, 30 is used to store the binning data generated during the binning operation. After the binning operation has been performed by the binning/rasterization engine(s), the binning data is written from the tile memory into the bin memory 62 of the system memory 55.

As will be discussed in more detail later, the control circuitry may allocate only a single binning/rasterization engine to perform the binning operation, or may allocate multiple of the binning/rasterization engines to perform the binning operation, such that different regions of the frame are allocated to different binning/rasterization engines, each region containing one or more tiles of the frame. By allocating more than one binning/rasterization engine 25, 30 to the binning process, the speed of the binning process can be significantly improved, thereby increasing overall performance of the graphics system.

Where the tile memory 27, 32 has insufficient space to store all of the binning information created by the associated binning/rasterization engine 25, 30 when operating in the first mode of operation, that binning/rasterization engine may be arranged to operate iteratively on different portions of the information, with the contents stored in the tile memory being written out to the bin memory 62 at the end of each iteration. For example, the tile memory may comprise a plurality of memory blocks, each memory block comprising n bits. Where, during the first mode of operation, each memory block is associated with a tile, this allows the binning operation to be performed in a single iteration for up to n graphics primitives. However, if the plurality of graphics primitives exceeds n, then the associated binning/rasterization engine may be arranged to operate iteratively in order to perform the binning operation, for each iteration a different set of up to n primitives being considered.

Similarly, if the number of tiles allocated to the binning/rasterization engine during the first mode of operation exceeds the number of pixels in a tile, then this will typically mean that the tile memory 27 will not have enough memory blocks to provide a separate memory block for each tile (typically the tile memory comprises a memory block for each pixel in a tile), and accordingly again the binning/rasterization engine may be arranged to operate iteratively in order to perform the binning operation, where for each iteration a different region of the frame is considered, each region having a number of tiles which do not exceed the number of pixels in a tile.

Once the binning operation has been completed, and accordingly the bin memory 62 within system memory 55 includes all of the binning data generated by the binning operation, then the cumulative binning data in the bin memory 62 will provide a tile list for each tile, where each tile list identifies those graphics primitives which intersect the corresponding tile. The process can now proceed to the rasterization stage. During the rasterization stage, the control circuitry is arranged to cause one or more of the binning/rasterization engines 25, 30 to be placed into the second mode of operation, where a particular tile is allocated to a binning/rasterization engine 25, and that binning/rasterization engine then performs a rasterization operation in respect of that tile. In particular, the binning/rasterization engine 25 will retrieve via the input/output interface 35 the corresponding tile list from the bin memory 62, and using that tile list will perform a rasterization operation in order to generate the graphics data for the allocated tile.

The rasterization operation operates in a conventional manner, and produces a variety of graphics data as will be understood by those skilled in the art. For example, such graphics data will typically include colour data (for example RGB values), a translucency value A, some depth information, some stencil information, etc. This information is produced for each pixel within the tile, with that information being stored in the corresponding memory block of the tile memory. Once the entire the has been processed, the graphics data stored in the tile memory is written to the relevant part of the frame buffer 60 of the system memory 55 via the input/out interface 35. Once all tiles have been processed, the frame buffer 60 will then contain graphics data for the entire frame, after which that graphics data can be routed to the display driver 80 to cause that frame to be displayed on a connected display device.

Figure 2:
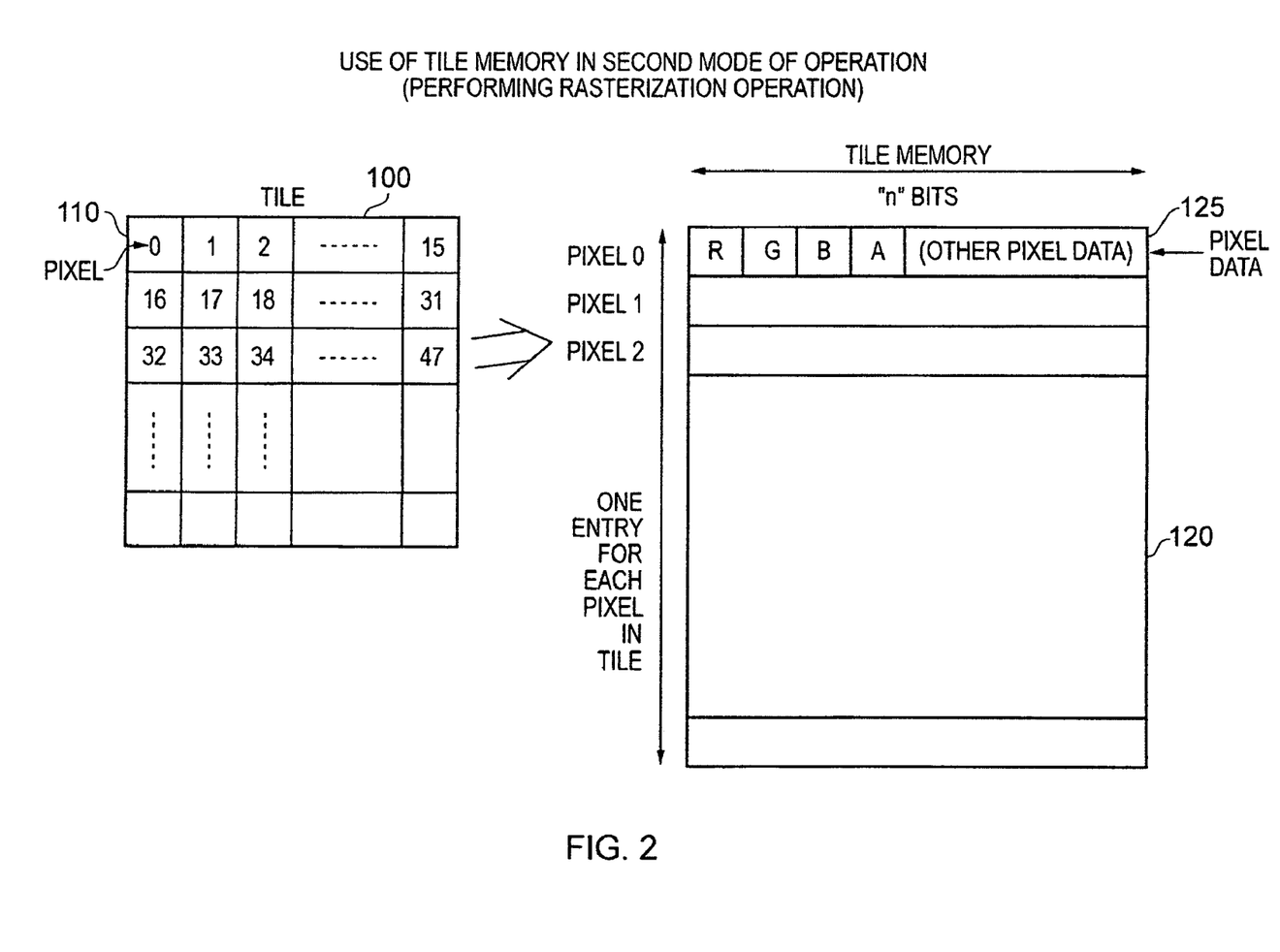
FIG. 2 is a diagram schematically illustrating the use of the tile memory when the binning/rasterization engine of one embodiment is operating in its second mode of operation.

FIG. 2 schematically illustrates how the tile memory 27, 32 is used by its associated binning/rasterization engine 25, 30 when operating in the second mode of operation, i.e. when performing a rasterization operation. In this case, the binning/rasterization engine 25 will be processing a tile 100 consisting of a plurality of pixels 110. In the example shown, the tile consists of an array of 16×16 pixels. In this example, the tile memory 120 will typically comprise a plurality of memory blocks 125, where each memory block is associated with one of the pixels. Accordingly, in this example, the tile memory 120 will consist of 256 memory blocks, i.e. one memory block for each pixel in the tile. Each memory block is used to store the pixel data for the associated pixel that is generated during the performance of the rasterization operation. As discussed earlier and shown in FIG. 2, such pixel data will typically include RGB values (or some other representation of colour values), a translucency value A, and various other pieces of pixel data.

Figure 3:
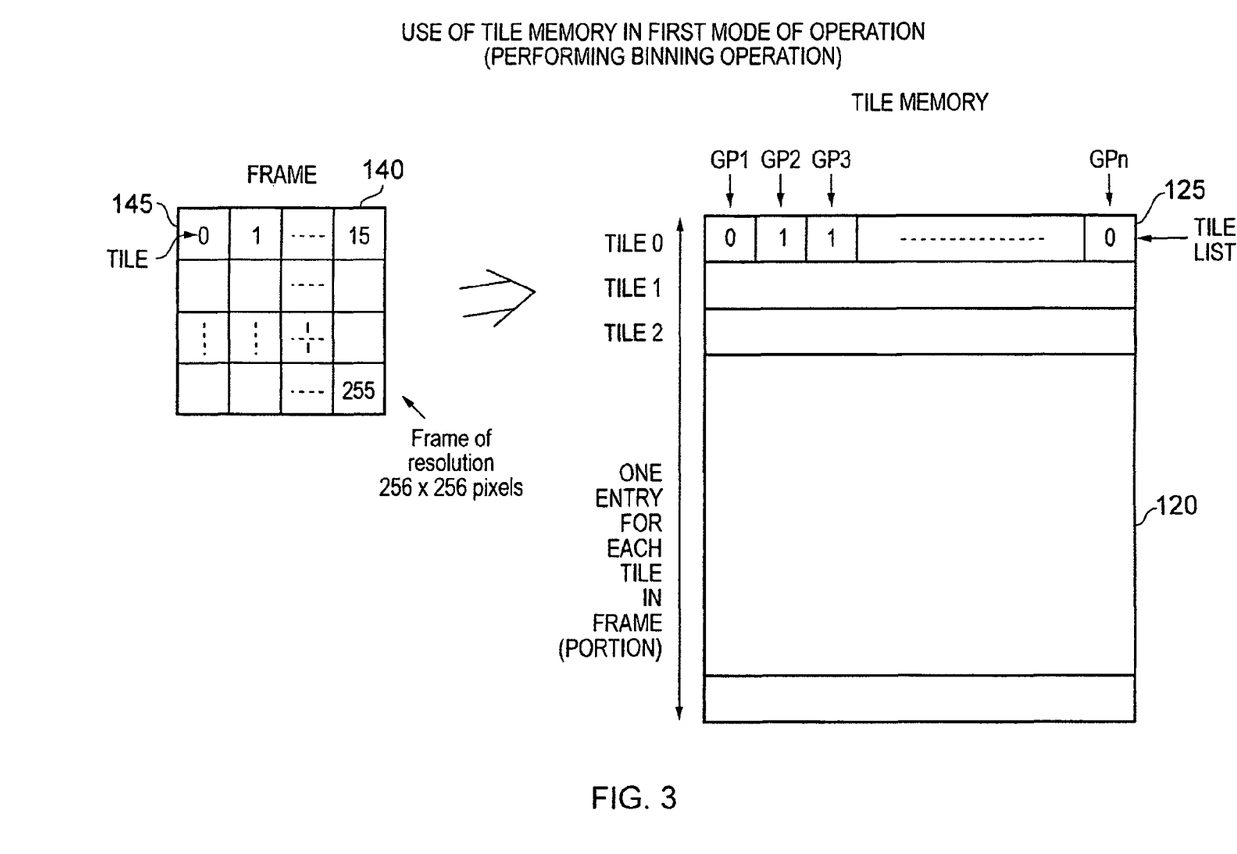
FIG. 3 is a diagram schematically illustrating the use of the tile memory when the binning/rasterization engine of one embodiment is operating in its first mode of operation.

FIG. 3 schematically illustrates how the same tile memory is used when the binning/rasterization engine is operating in the first mode of operation, i.e. is performing a binning operation. In this example, the binning/rasterization engine 25 will be processing a frame (or frame region) 140, consisting of a plurality of tiles 145. Given the example of FIG. 2 where the tile memory has 256 memory blocks, then it will be appreciated that if the frame has less than or equal to 256 tiles, then each of the tiles can be allocated a separate memory block in the tile memory. In the example shown in FIG. 3, it is assumed that there are 256 tiles, and that hence the frame has a resolution of 256×256 pixels assuming the pixel per tile ratio of FIG. 2. As discussed earlier, if the frame has a larger resolution, and hence there are more than 256 tiles, then one of the binning/rasterization engines 25 can be arranged to operate iteratively, during each iteration a different region of the frame being considered, or alternatively different regions of the frames can be allocated to different binning/rasterization engines.

As shown in FIG. 3, each memory block 125 of the tile memory 120 is allocated to a particular tile, and each of the n bits within that memory block is associated with a different graphics primitive. Hence, provided the number of graphics primitives generated by the application 75 for a particular frame do not exceed n, then all of the graphics primitives can be processed during a single iteration of the binning operation within the binning/rasterization engine 25. If the number of graphics primitives exceed n, then as discussed earlier, multiple iterations of the binning process can be performed within the binning/rasterization engine, on each iteration a different n primitives being considered.

Accordingly, as shown in FIG. 3, each bit within a memory block associated with a particular tile is set or cleared to indicate whether the associated graphics primitive is determined to intersect that tile. In the example illustrated in FIG. 3, it is assumed that each bit is cleared to a logic zero value and set to a logic one value. When set, this indicates that the associated graphics primitive has been determined to intersect the relevant tile. Hence, in the example shown in FIG. 3, graphics primitives 2 and 3 have been determined to intersect tile 0.

Figure 4:
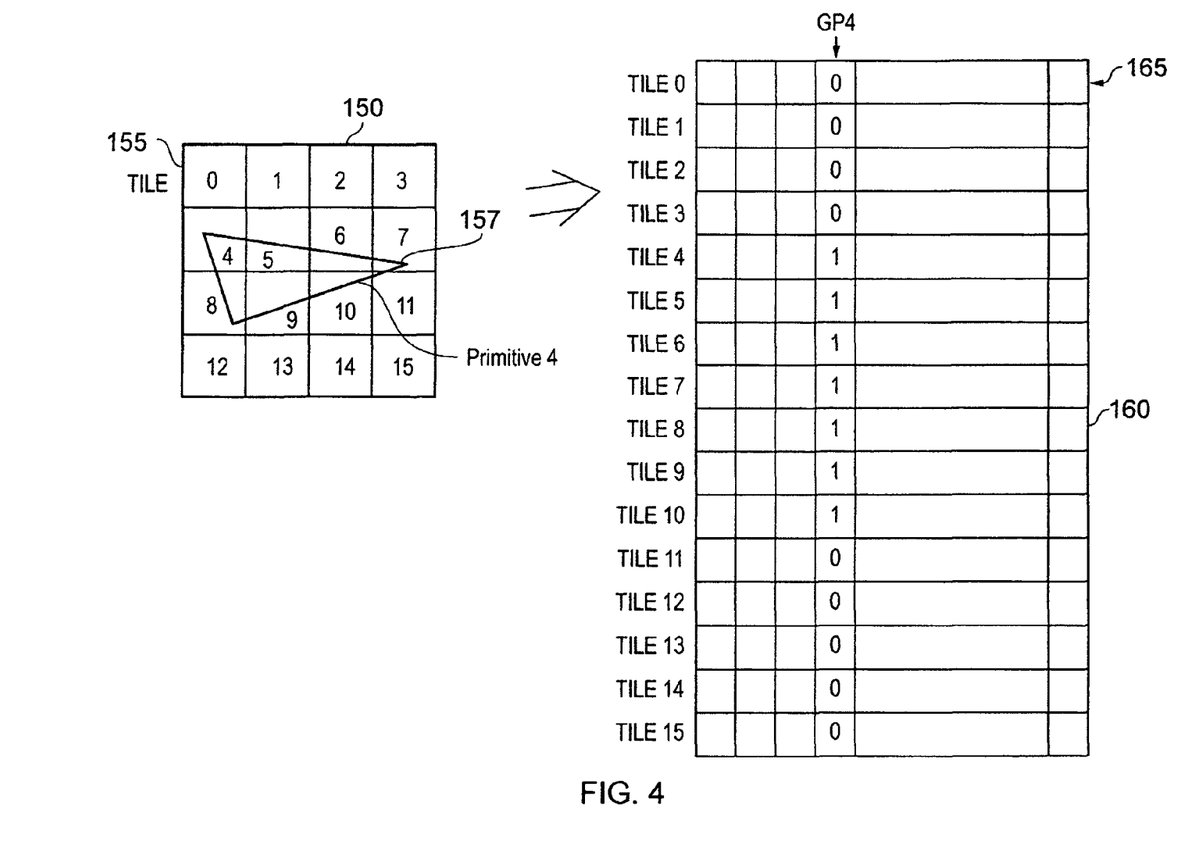
FIG. 4 illustrates how the various tile lists maintained in the tile memory are updated for each graphics primitive in accordance with one embodiment.

FIG. 4 further illustrates how the individual bits within the tile memory are set during the binning operation. In this example, it is assumed that primitive 4 is the triangle 157 drawn within the frame 150, in this simple example it being assumed for ease of illustration that the frame 150 consists of 16 tiles 155.

Within the tile memory 160, each memory block 165 is associated with a different tile. After the binning operation has been applied, each of the bits in each of the memory blocks will have been set or cleared to indicate whether the associated graphics primitive has intersected the corresponding tile. The information stored at the end of the binning operation in association with graphics primitive 4 is shown in FIG. 4. In particular, the fourth bit of each memory block represents graphics primitive 4, and it can be seen that this bit has been set within the memory blocks associated with tiles 4 to 10, and cleared in all of the other memory blocks.

Figure 5:
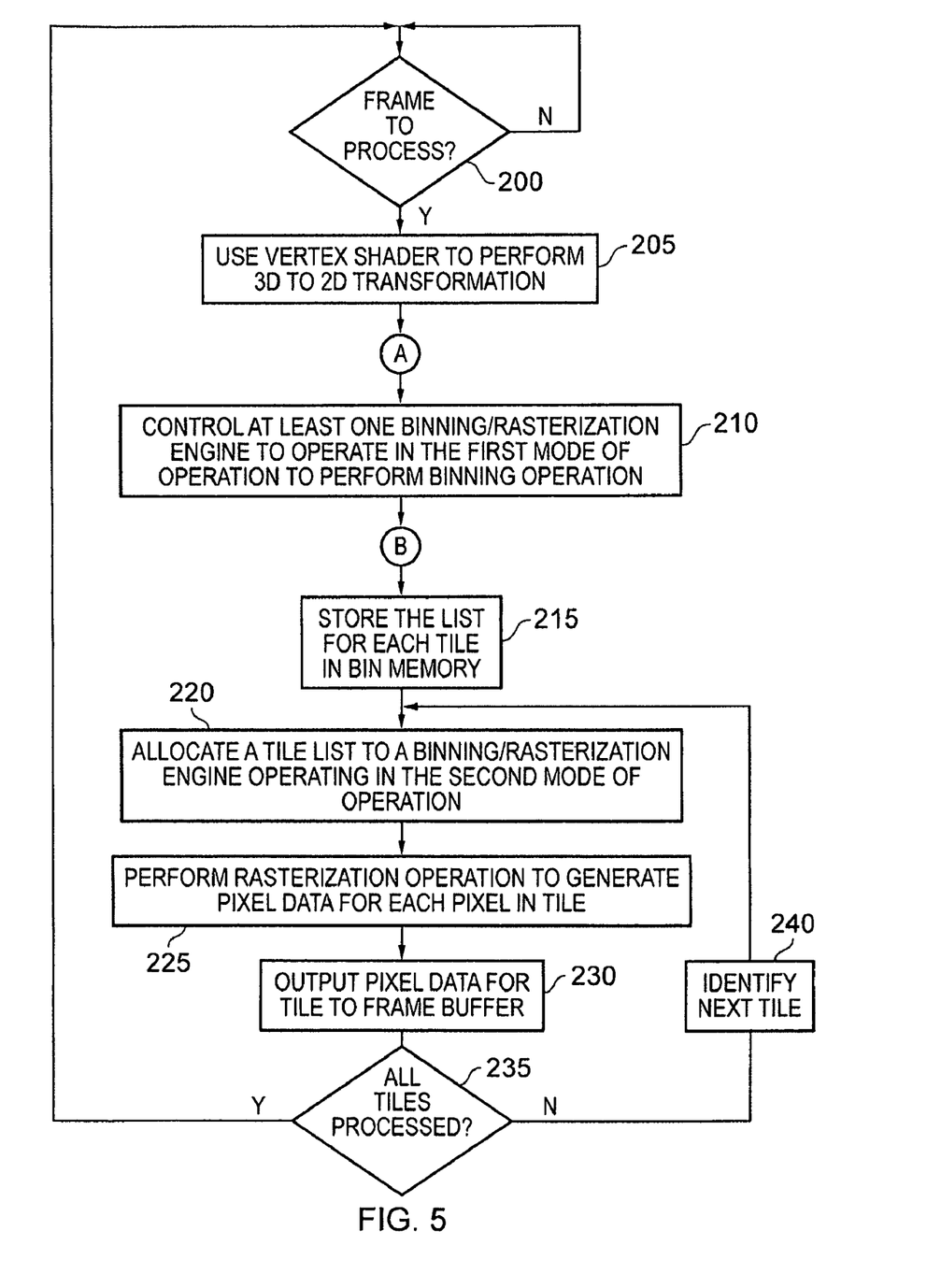
FIG. 5 is a flow diagram illustrating the operation of the system of FIG. 1 in accordance with one embodiment.

FIG. 5 is a flow diagram illustrating the operation of the data processing system of FIG. 1 in accordance with one embodiment. At step 200, it is determined whether the graphics processing unit 10 has a frame to process, i.e. whether the application 75 has generated a set of graphics primitives for a particular frame. Once this has been determined, the process proceeds to step 205, where the vertex shader provided by transformation circuit 15 is used to perform the required 3D to 2D transformation of the graphics primitives. Thereafter, at step 210, at least one of the binning/rasterization engines 25, 30 is controlled to operate in the first mode of operation in order to perform the earlier described binning operation. The operations performed at step 210 will be discussed in more detail later with reference to FIGS. 6 and 7.

After the binning operation has been completed, the tile list for each tile will be stored in the bin memory 62, as represented by the step 215. As discussed earlier, where the tile memory is sufficient to store the binning information for an entire frame, the tile list information may be stored in the bin memory during a single store operation performed at the end of the binning operation. However, where the tile memory is not big enough to store all of the binning information, then the required binning operations may be performed iteratively within one or more binning/rasterization engines, and/or in parallel across multiple binning/rasterization engines, and in such cases the bin memory 62 may be updated a number of times during the binning operation, such that that at the end of the binning operation the contents of the bin memory then provide a tile list for each tile.

Following step 215, a tile list is allocated to a binning/rasterization engine that has been controlled by the control circuitry 20 to operate in the second mode of operation (see step 220). Thereafter, at step 225, that allocated binning/rasterization engine performs a rasterization operation to generate pixel data for each pixel in the tile. That pixel data will be retained within the tile memory until the end of the rasterization operation, whereafter the pixel data will be output to the frame buffer 60 at step 230. Thereafter, at step 235, it is determined whether all tiles have been processed, and if not a next tile is identified at step 240, and the process returns to step 220. Whilst steps 220, 225, 230, 235 and 240 are shown sequentially, it will be understood from the earlier discussion that different tiles can be allocated to different binning/rasterization engines in parallel, so that multiple tiles can be processed in parallel. However, at some point it will be determined at step 235 that all tiles have been processed, whereafter the process will return to step 200 to await the next frame to be processed.

Figure 6:
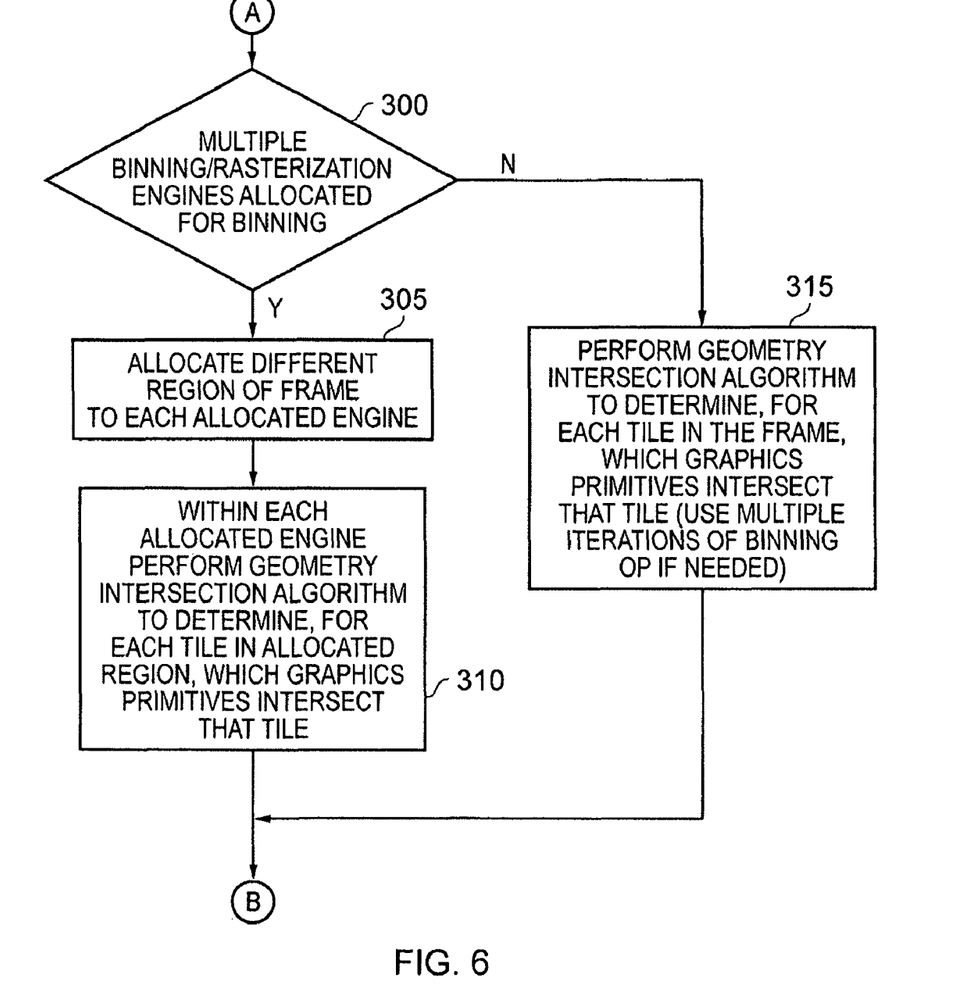
FIG. 6 is a flow diagram illustrating in more detail the steps performed at step 210 of FIG. 5 in accordance with one embodiment.

FIG. 6 illustrates the process performed at step 210 of FIG. 5 in accordance with one embodiment. At step 300, it is determined whether multiple binning/rasterization engines are to be allocated to perform the binning process. If not, then the process proceeds to step 315, where the binning/rasterization engine is arranged to apply a geometry intersection algorithm to determine, for each tile in the frame, which graphics primitives intersect that tile. As discussed earlier, multiple iterations of the binning operation may be used as necessary in order to ensure that all of the graphics primitives are considered for each of the tiles in the frame.

If multiple binning/rasterization engines are to be allocated for binning, then the process proceeds to step 305, where different regions of the frame are allocated to each allocated engine. Alternatively, or in addition, where the number of primitives to be considered exceed the space available in each memory block of the tile memory, then different groups of primitives can be allocated to different binning/rasterization engines, with each binning/rasterization engine then working on the same frame or frame region. The information stored in each tile memory can then be merged when it is written to the bin memory.

Following step 305, the geometry intersection algorithm is applied at step 310 within each allocated engine in order to determine, for each tile in the allocated region, which graphics primitives intersect that tile, with the tile memory being updated accordingly.

Figure 7:
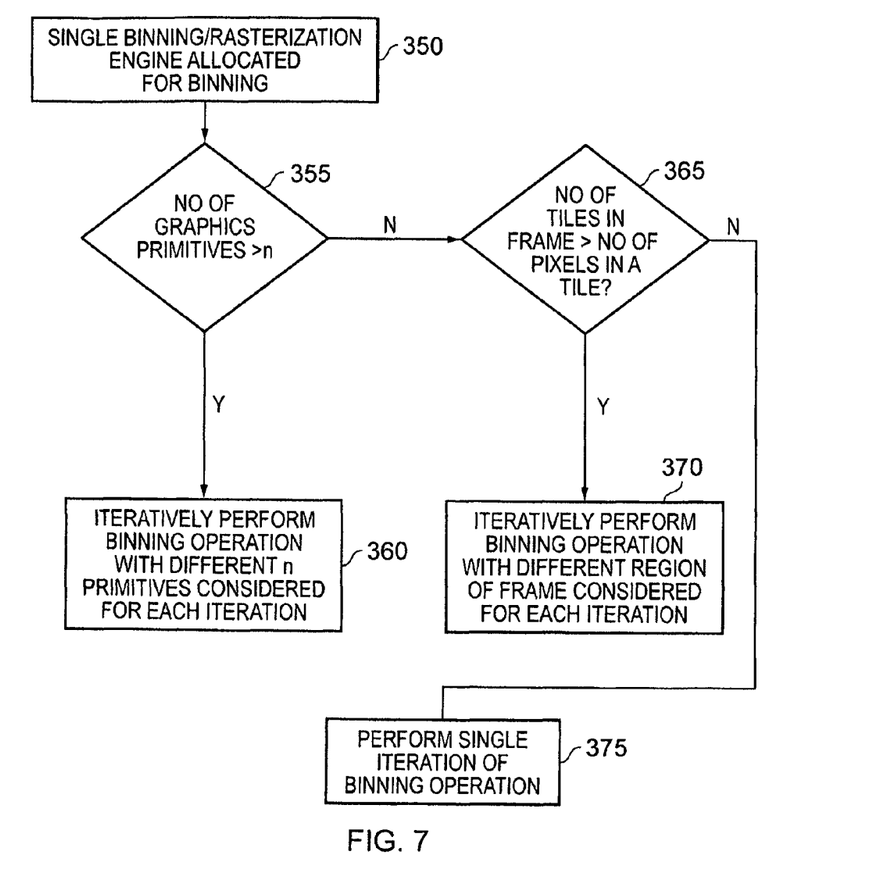
FIG. 7 is a flow diagram illustrating the steps performed at step 315 of FIG. 6 in accordance with one embodiment.

FIG. 7 is a flow diagram illustrating in more detail the steps that may be performed at step 315 of FIG. 6 in accordance with one embodiment. In particular, FIG. 7 identifies situations where, if a single binning/rasterization engine is being used, it would be appropriate to perform multiple iterations of the binning operation. In particular, when a single binning/rasterization engine is allocated for binning at step 350, then it is determined at step 355 whether the number of graphics primitives exceeds n, i.e. the number of bits within each memory block of the tile memory. If it is, then the process proceeds to step 360, where the binning operation is performed iteratively, with a different n primitives being considered for each iteration. Clearly, in a final iteration, there may be less than n primitives considered, since the total number of primitives may not be a multiple of n.

If at step 355, it is determined that the number of graphics primitives is not greater than n, then the process proceeds to step 365, where it is determined whether the number of tiles in the frame is greater than the number of pixels in a tile. If so, then the process proceeds to step 370, where the binning operation is performed iteratively, with a different region of the frame considered for each iteration. If at step 365 it is determined that the number of tiles in the frame does not exceed the number of pixels in a tile, then a single iteration can be performed at step 375.

In addition, it will be understood that if the number of graphics primitives exceeds n and the number of tiles in the frame exceeds the number of pixels in a tile, then it may be necessary to perform step 360 for a particular frame region, and then move onto another frame region, with step 360 again being performed in respect of that frame region, until all graphics primitives have been considered for all frame regions. In practice, in such situations, it will be advantageous to allocate multiple binning/rasterization engines during the binning process, so as to allow a significant increase in speed of the binning operation.

Figure 8:
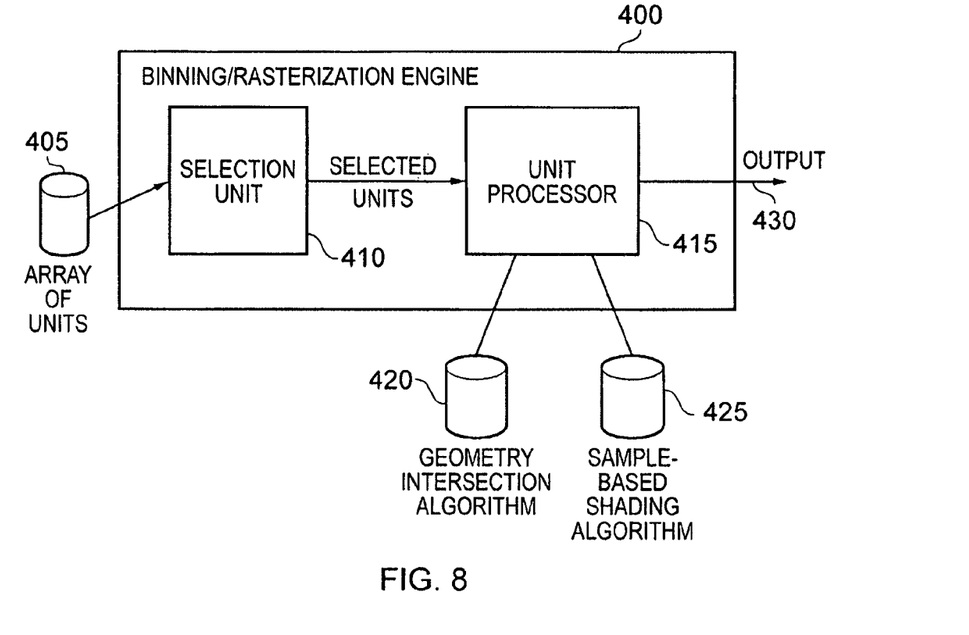
FIG. 8 is a diagram illustrating the binning/rasterization engine of one embodiment.

FIG. 8 illustrates the basic structure of the binning/rasterization engine in accordance with one embodiment. In particular, the binning/rasterization engine 400 has a selection unit 410 which is arranged to select individual units from an array of units 405. In the first mode of operation, where the binning/rasterization engine 400 is performing a binning operation, each unit comprises a tile, whilst in the second mode of operation where the binning/rasterization engine is performing a rasterization operation, each unit comprises a pixel of an allocated tile. Selection units suitable for selecting pixels for processing within a rasterization engine are well-known, and any such selection unit can be used to embody the selection unit 410 of the combined binning/rasterization engine 400. As far as the selection unit is concerned, the basic operation is the same whether a binning operation or a rasterization operation is being performed, and merely the meaning of the units being handled changes.

As each unit is selected by the selection unit, that unit is passed to the unit processor 415 for processing. In particular, the unit processor 415 computes output data to be associated with the selected unit. In the first mode of operation where a binning operation is performed, the output data indicates which of the plurality of graphics primitives intersect the selected unit, and the unit processor applies a geometry intersection algorithm 420 in order to determine which graphics primitives intersect the selected unit. In the second mode of operation the output data provides pixel data for the selected unit which is dependent on how that selected unit is intersected by the graphics primitives, the unit processor in one embodiment applying a sample-based shading algorithm 425 to determine the pixel data.

Sample-based shading algorithms are well-known for use in rasterization engines, and any of such well-known sample-based shading algorithms may be used as the shading algorithm 425. In accordance with such sample-based shading algorithms, a number of discrete sampling points within a pixel are used to determine whether a pixel should be considered as part of a primitive or not. Whilst in principle such a sampled-based algorithm could still be used for the binning operation, it is likely that the use of such discrete sampling points would miss certain intersections in the binning operation, since in the binning operation the primitive may intersect the tile anywhere within the tile. Accordingly, in one embodiment a separate geometry intersection algorithm 420 is used by the unit processor during binning operations performed by the binning/rasterization engine 400. There are a number of suitable geometry intersection algorithms that will be well understood by those skilled in the art, and accordingly such algorithms will not be discussed further herein.

Figure 9:
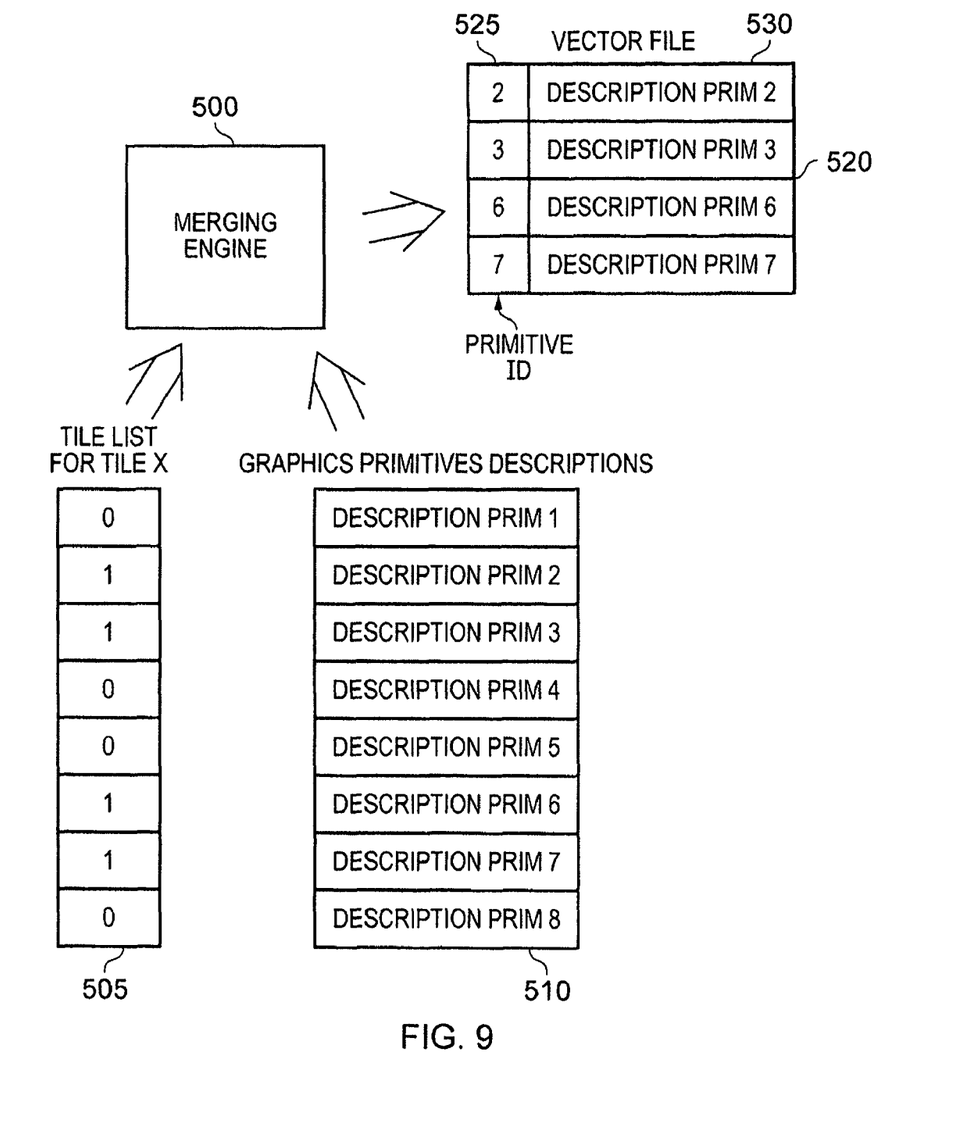
FIG. 9 is a diagram illustrating the operation of the merging engine of one embodiment.

As will be apparent from the earlier discussion of FIGS. 3 and 4, the tile lists produced by the binning operation consist of a sequence of zeros and ones, each bit being associated with a particular primitive, a logic zero value indicating that that graphics primitive is not within the tile, and a logic one value indicating that the graphics primitive is within the tile (it will be well understood that in alternative embodiments the meaning of a logic zero and a logic one value may be swapped). FIG. 9 illustrates how a merging engine 500 may be used in an optimisation of the above described process to produce a vector file for use by the rasterization engine. In particular, in addition to the above-described tile list stored in the bin memory 62, it will also be understood that the transform memory 64 contains graphics primitives descriptions for each of the 2D graphics primitives output by the transformation circuit 15. The merging engine 500 receives the tile list 505 for a particular tile and the graphics primitive descriptions 510 for each of the graphics primitives. Based on this information, it then produces a vector file 520 which includes an identifier 525 for each graphics primitive that intersects the tile, along with the associated description for that primitive 530. Accordingly, in the example shown in FIG. 9 where graphics primitives 2, 3, 6 and 7 intersect the tile, it will be seen that the vector file 520 is as shown in upper right hand side of FIG. 9. The vector file is then used by the binning/rasterization engine 25, 30 allocated to process the corresponding tile in the second mode of operation.

The merging engine can be constructed in a variety of ways, but in one embodiment is formed by a shading engine. In one embodiment, this may be the shading engine already provided within the allocated binning/rasterization engine to perform the shading operations required as part of the rasterization process.

Figure 10:
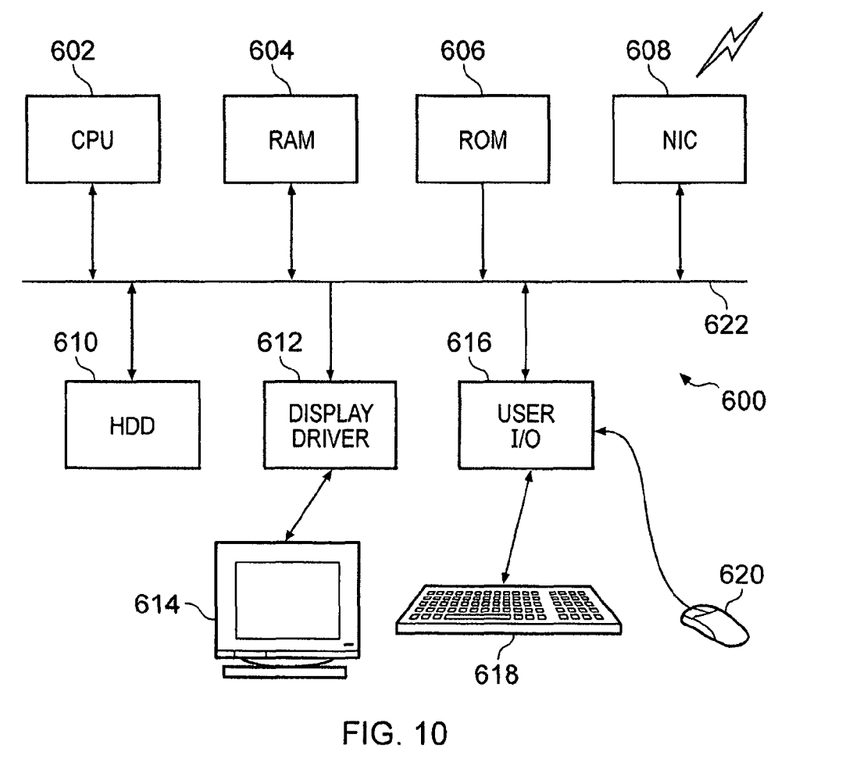
FIG. 10 schematically illustrates a general purpose computer of the type that may be used in one embodiment to implement a tile-based graphics system.

Whilst the graphics system of one embodiment may be provided by suitable hardware, for example by a dedicated graphics processing unit 10 such as shown in FIG. 1, in another embodiment the graphics system may be embodied by software executing on a general purpose processor. For example, FIG. 10 schematically illustrates a general purpose computer 600 that may be used in one embodiment. The general purpose computer 600 includes a central processing unit 602, a random access memory (RAM) 604, a read only memory (ROM) 606, a network interface card 608, a hard disk drive 610, a display driver 612 and monitor 614, and a user input/output circuit 616 with a keyboard 618 and a mouse 620 all connected via a common bus 622. In operation, the central processing unit 602 will execute computer program instructions that may be stored in one or more of the random access memory 604, the read only memory 606 and the hard disk drive 610, or dynamically downloaded via the network interface card 608. The results of the processing performed may be displayed to a user via the display driver 612 and the monitor 614. User inputs for controlling the operation of the general purpose computer 600 may be received via the user input/output circuit 616 from the keyboard 618 or the mouse 620. It will be appreciated that the computer program could be written in a variety of different computer languages. The computer program may be stored and distributed on a recording medium or dynamically downloaded to the general purpose computer 600.

When operating under control of an appropriate computer program, the general purpose computer 600 can perform the above described graphics processing techniques and can be considered to form an apparatus for performing those techniques. In particular, a generic software routine can be provided for implementing the functionality of the binning/rasterization engine, in one mode of operation the software routine implementing a geometry intersection algorithm to perform a binning operation, whilst in another mode of operation the software routine performing a sample-based shading algorithm to perform a rasterization operation. This avoids the need for a completely discrete binning implementation to be provided as part of, the graphics system, and allows for improved efficiency in the running of the graphics rendering process.

From the above description of embodiments, it will be appreciated that such embodiments avoid the need for providing a dedicated binning implementation within a graphics system, by allowing a combined implementation to perform both binning and rasterization. In one particular embodiment, an existing rasterization implementation is modified, so as to support binning, and is then able to operate either in a first mode of operation to perform the binning operation, or in a second mode of operation to perform rasterization. This can significantly improve the overall operation of the graphics system, by reducing energy consumption, and improving performance. In a hardware implementation, it can also result in a reduction of the size of the graphics hardware, giving rise to associated reductions in cost.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

I claim:

1. A tile-based graphics system for generating graphics data for a frame comprising a plurality of tiles, comprising:
    an input means for receiving a plurality of graphics primitives for the frame;
    graphics processing circuitry configured to operate in a first mode of operation and a second mode of operation;
    in said first mode of operation said graphics processing circuitry receiving said plurality of graphics primitives from said input means, and being configured to perform a binning operation to determine, for each of said plurality of tiles, a tile list identifying the graphics primitives from amongst said plurality which intersect that tile;
    in said second mode of operation, said graphics processing circuitry receiving said tile list for an allocated tile, and being configured to perform a rasterization operation to generate said graphics data for said allocated tile dependent on said tile list; and
    control circuitry for controlling switching of the graphics processing circuitry between said first mode of operation and said second mode of operation.

2. The tile-based graphics system of claim 1, wherein:
    said graphics processing circuitry comprises a working memory comprising a plurality of memory blocks;
    in said first mode of operation, each memory block is associated with a tile, and during the binning operation the graphics processing circuitry is configured to record within each memory block which graphics primitives from amongst said plurality intersect the tile associated with each respective memory block; and
    in said second mode of operation, each memory block is associated with a pixel of the allocated tile, and during said rasterization operation the graphics processing circuitry is configured to store within each memory block pixel data generated for the pixel associated with each respective memory block.

3. The tile-based graphics system of claim 2, wherein:
    the graphics processing circuitry is a rasterization circuit that is modified to support said first mode of operation; and
    the working memory is a tile memory provided for use by the rasterization circuit when performing the rasterization operation, and arranged to be re-used during said first mode of operation to record which graphics primitives from amongst said plurality intersect the tile associated with each memory block.

4. The tile-based graphics system of claim 3, wherein the rasterization circuitry comprises:
    selection circuitry which selects individual units from an array of units, in the first mode of operation each unit comprising one of said tiles, and in the second mode of operation each unit comprising a pixel of the allocated tile; and
    unit processing circuitry for computing, for a selected unit, output data to be associated with that unit, in the first mode of operation the output data indicating which of said plurality of graphics primitives intersect the selected unit, and in the second mode of operation the output data providing pixel data for the selected unit which is dependent on how that selected unit is intersected by said plurality of graphics primitives.

5. The tile-based graphics system of claim 4, wherein in the first mode of operation the unit processing circuitry executes a geometry intersection algorithm, and in the second mode of operation the unit processing circuitry executes a sample-based shading algorithm.

6. The tile-based graphics system of claim 2, wherein:
    each memory block comprises n bits, where n is a positive integer; and
    during said first mode of operation the graphics processing circuitry performs the binning operation for up to n graphics primitives.

7. The tile-based graphics system of claim 6, wherein:
    if said plurality of graphics primitives exceeds n, the control circuitry is arranged to cause the graphics processing circuitry to iteratively perform said binning operation in said first mode of operation, for each iteration a different n graphics primitives being considered.

8. The tile-based graphics system of claim 7, wherein:
    between each iteration, the contents of the working memory are written to a bin memory.

9. The tile-based graphics system of claim 2, wherein if the number of tiles in a frame exceed the number of pixels in a tile, the control circuitry is arranged to cause the graphics processing circuitry to iteratively perform said binning operation in said first mode of operation, for each iteration a different region of the frame being considered, each region having a number of tiles which do not exceed the number of pixels in a tile.

10. The tile-based graphics system of claim 9, wherein:
    between each iteration, the contents of the working memory are written to a bin memory.

11. The tile-based graphics system of claim 2, wherein said working memory is provided locally to the graphics processing circuitry.

12. The tile-based graphics system of claim 1, wherein:
    said graphics processing circuitry comprises a plurality of graphics processing engines, each of which is controlled by the control circuitry to operate in said first mode of operation or said second mode of operation.

13. The tile-based graphics system of claim 12, wherein:
    the control circuitry is arranged to place multiple of said graphics processing engines in said first mode of operation and to allocate different regions of the frame to different ones of those graphics processing engines, such that the binning operation is performed in parallel across the multiple graphics processing engines.

14. The tile-based graphics system of claim 6, wherein:
the tile list produced by the graphics processing circuitry comprises a sequence of bits, each bit being associated with a corresponding graphics primitive and its value indicating whether the corresponding graphics primitive intersects the associated tile or not;
the tile-based graphics system further comprising:
a merging engine for receiving the tile list and a description of each graphics primitive and producing a vector file comprising a plurality of vectors, each vector providing a description of one of said graphics primitives which does intersect the associated tile, the vector file being used by the graphics processing circuitry when operating in said second mode of operation to generate graphics data for said associated tile.

15. The tile-based graphics system of claim 14, wherein said merging engine comprises a shading engine provided by said graphics processing circuitry.

16. The tile-based graphics system as claimed in claim 1, wherein said graphics processing circuitry includes a shading engine for performing said binning operation.

17. A method of operating a data processing system to generate graphics data for a frame comprising a plurality of tiles, comprising the steps of:
selectively switching graphics processing logic between a first mode of operation and a second mode of operation during the process of generating said graphics data;
when in said first mode of operation, said graphics processing logic receiving a plurality of graphics primitives for the frame, and performing a binning operation to determine, for each of said plurality of tiles, a tile list identifying the graphics primitives from amongst said plurality which intersect that tile;
when in said second mode of operation, said graphics processing logic receiving said tile list for an allocated tile, and performing a rasterization operation to generate said graphics data for said allocated tile dependent on said tile list; and
outputting said graphics data for said frame when the rasterization operation has been performed for each of said tiles.

18. A non-transitory storage medium comprising a computer program which, when executed on a computer, causes said computer to perform a method of generating graphics data for a frame comprising a plurality of tiles according to claim 17.

19. A tile-based graphics system for generating graphics data for a frame comprising a plurality of tiles, comprising:
input means for receiving a plurality of graphics primitives for the frame;
graphics processing means for operating in a first mode of operation and a second mode of operation;
in said first mode of operation, said graphics processing means for receiving said plurality of graphics primitives from said input means, and for performing a binning operation to determine, for each of said plurality of tiles, a tile list identifying the graphics primitives from amongst said plurality which intersect that tile;
in said second mode of operation, said graphics processing means for receiving said tile list for an allocated tile, and for performing a rasterization operation to generate said graphics data for said allocated tile dependent on said tile list; and
control means for controlling switching of the graphics processing means between said first mode of operation and said second mode of operation.

* * * * *